(12) United States Patent
Yonekubo et al.

(10) Patent No.: US 7,688,726 B2
(45) Date of Patent: Mar. 30, 2010

(54) BROADCAST RECEPTION APPARATUS, TS PACKET REPRODUCTION APPARATUS, BROADCAST RECEPTION METHOD AND PROGRAM

(75) Inventors: Hiroshi Yonekubo, Tokyo (JP); Masakazu Suzuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 17 days.

(21) Appl. No.: 12/241,620

(22) Filed: Sep. 30, 2008

(65) Prior Publication Data

US 2009/0110002 A1    Apr. 30, 2009

(30) Foreign Application Priority Data

Oct. 30, 2007    (JP)    ............... 2007-282250

(51) Int. Cl.
*G01R 31/08* (2006.01)
*H04L 12/28* (2006.01)
*H04J 3/24* (2006.01)

(52) U.S. Cl. .................... 370/230; 370/235; 370/389; 370/473

(58) Field of Classification Search .............. None
See application file for complete search history.

(56) References Cited

U.S. PATENT DOCUMENTS 7,366,961 B1 * 4/2008 Kovacevic et al. .......... 714/701

2005/0169303 A1 * 8/2005 Toma et al. ................. 370/466
2006/0215711 A1 * 9/2006 Mori ......................... 370/542

FOREIGN PATENT DOCUMENTS

| JP | 08-181983 | 7/1996 |
| JP | 10-32821 | 2/1998 |
| JP | 2005-26990 | 1/2005 |
| JP | 2006-74318 | 3/2006 |

* cited by examiner

*Primary Examiner*—Kevin C Harper
*Assistant Examiner*—Christine Duong
(74) *Attorney, Agent, or Firm*—Knobbe, Martens, Olson & Bear LLP

(57) ABSTRACT

According to one embodiment, a broadcast reception apparatus includes a reception unit which receives a broadcast signal, and outputs a transport stream, a first determination unit which receives the transport stream as TS packets, and determines whether a PES header exists in each TS packet, a second determination unit which determines whether the PES header is normal, when the first determination unit detects the PES header, a search unit which detects a payload start position by searching the TS packet sequentially from the rear end, when the second determination unit determines the PES header to be abnormal, a separator which separates payloads at and after the payload start position, and a decoder which decodes the separated payloads of the TS packets, and outputs video and audio signals.

8 Claims, 9 Drawing Sheets

BROADCAST RECEPTION APPARATUS, TS PACKET REPRODUCTION APPARATUS, BROADCAST RECEPTION METHOD AND PROGRAM

CROSS-REFERENCE TO RELATED APPLICATIONS

This application is based upon and claims the benefit of priority from Japanese Patent Application No. 2007-282250, filed Oct. 30, 2007, the entire contents of which are incorporated herein by reference.

BACKGROUND

1. Field

One embodiment of the present invention relates to a broadcast reception apparatus for a transport stream of one-segment broadcast, etc., a TS packet reproduction apparatus, and a broadcast reception method and program.

2. Description of the Related Art

Recently, one-segment broadcasting has become popular as digital terrestrial broadcasting easy to receive with a cellular phone, for example. A broadcast signal of the so-called one-segment broadcast is demodulated to a transport stream with a tuner, and reproduced with a transport stream (TS) packet reproduction unit.

Such a TS packet may cause a signal error during transmission. When a signal error occurs in a TS packet, an error flag is set in the TS packet, and the error is detected by a TS packet reproduction unit.

Jpn. Pat. Appln. KOKAI Publication No. 8-181983 discloses the technique, in which when a data error of a TS packet is detected by a packet reproduction unit, the TS packet is abandoned as an error packet. When a normal TS packet is received thereafter, the reproduction unit restarts reproduction.

However, in such a conventional technique as disclosed in Jpn. Pat. Appln. KOKAI Publication No. 8-181983, a whole TS packet is abandoned even if an error is detected only in a part of a TS packet and the other data of the TS packet is normal. Thus, the timing of reproducing the payloads at and after the error in the TS packet cannot be detected. As a result, video reproduction is interrupted for about 5 seconds at the longest.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter. In general, according to one embodiment of the invention, there is provided a broadcast reception apparatus comprising a reception unit which receives a broadcast signal, and outputs a transport stream; a first determination unit which receives the transport stream from the reception unit as TS packets, and determines whether a PES header exists in one TS packet; a second determination unit which determines whether the PES header is normal, when the first determination unit detects the PES header; a search unit which detects a payload start position by searching the TS packet sequentially from the rear end, when the second determination unit determines the PES header to be abnormal; a separator which separates payloads at and after the start position of the payload detected by the search unit; and a decoder which decodes the payloads of the TS packet separated by the separator, and outputs video audio signals.

Even if a PES header is abnormal, a payload start position is detected by searching the TS packet from the rear end, and the TS packet is reproduced by separating the payloads at and after the start position. Therefore, the timing of reproducing the payloads of subsequent TS packets is ensured, and video reproduction is apparently not interrupted.

Hereinafter, embodiments of the invention will be explained with reference to the accompanying drawings.

(Configuration)

Figure 1:
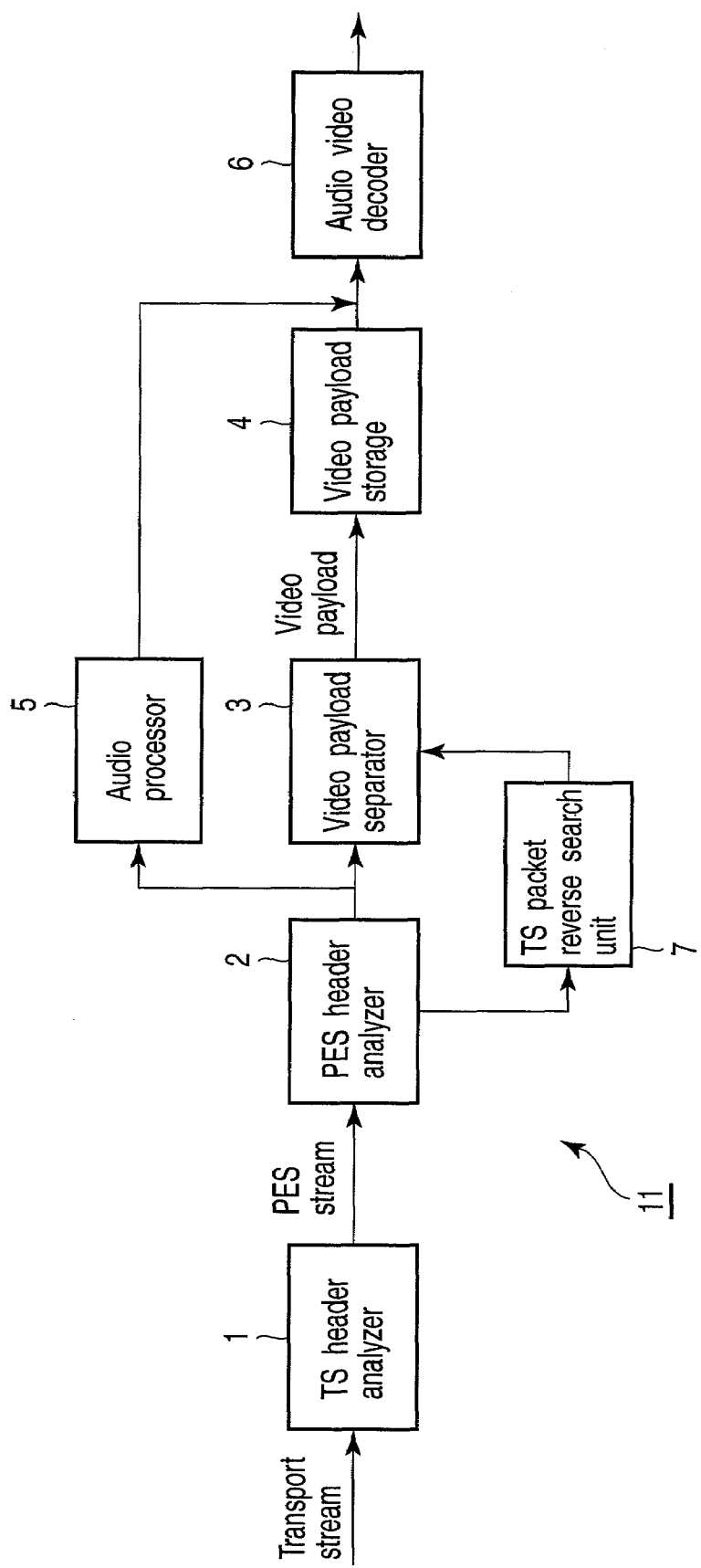
FIG. 1 is a block diagram showing an example of the configuration of a TS packet reproduction apparatus according to an embodiment of the invention.

FIG. 1 is a block diagram shown in an example of the configuration of a TS packet reproduction apparatus according to an embodiment of the invention. As shown in FIG. 1, a TS packet reproduction apparatus 11 according to an embodiment of the invention comprises a TS header analyzer 1 which is supplied with a transport stream, and detects a TS header; a PES header analyzer 2 which detects a packetized elementary stream (PES) header from a transport stream; a TS packet reverse search unit 7 which detects an error when a PES header may include an error, and detects a start code (ST) that is the beginning information of a payload of a TS packet by searching the TS packet from the rear end; and a video payload separator 3 which separates a payload from a TS packet. Further, the TS packet reproduction apparatus 11 has a video payload storage 4 which stores a video payload to be transferred to an audio/video decoder 6; an audio processor 5 which processes an audio payload as appropriate; and an audio/video decoder 6 which decodes audio and video payloads, and converts the decoded payloads into audio and video signals.

The TS packet reproduction apparatus 11 is provided inside a broadcast reception apparatus as described later, and reproduces a transport stream from a tuner, and outputs audio and video signals.

(Structure of TS Packet)

Figure 2:
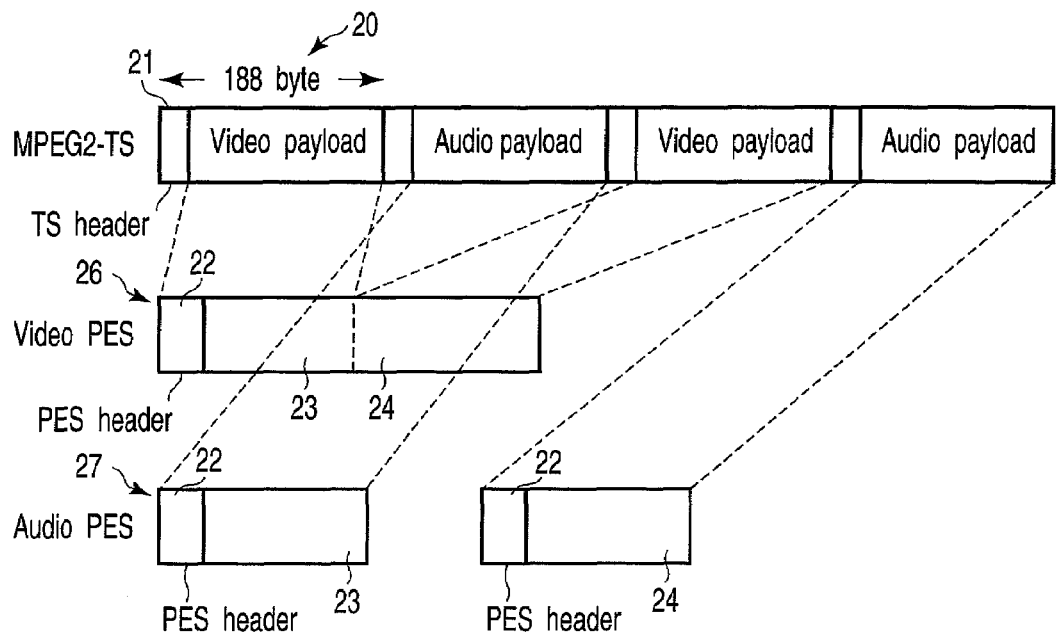
FIG. 2 is a diagram showing an example of a transport stream handled by a TS packet reproduction apparatus according to an embodiment of the invention.
Figure 3:
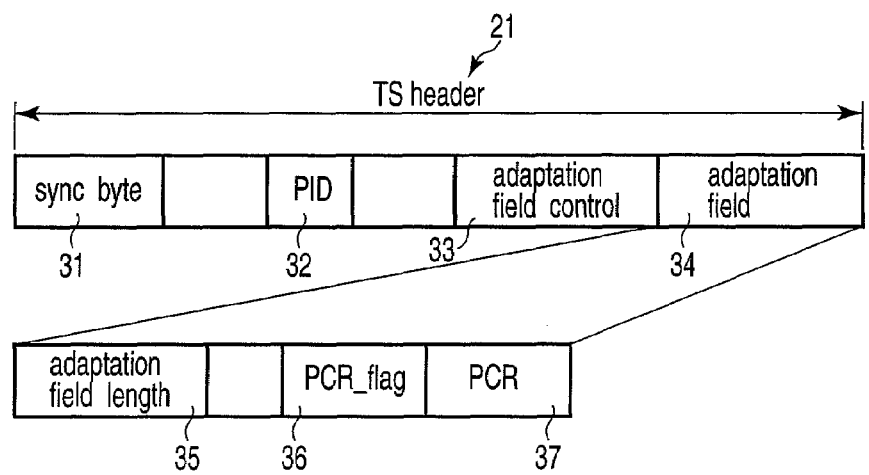
FIG. 3 is a diagram showing an example of a transport header of a transport stream handled by a TS packet reproduction apparatus according to an embodiment of the invention.
Figure 4:
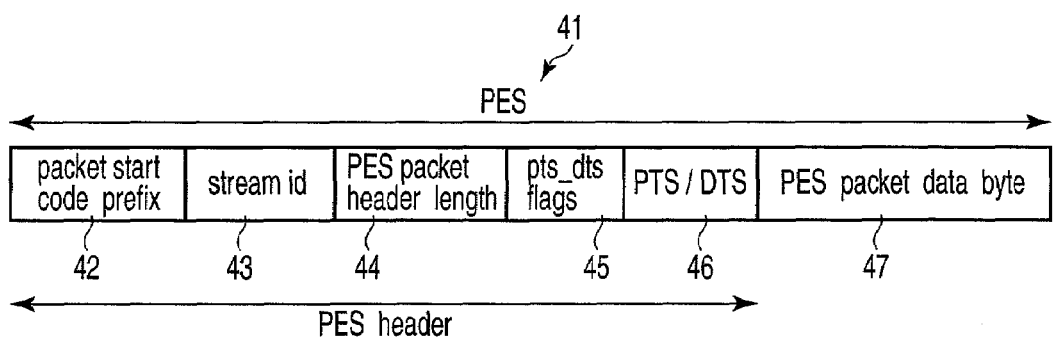
FIG. 4 is a diagram showing an example of a PES of a transport stream handled by a TS packet reproduction apparatus according to an embodiment of the invention.

The structure of a TS packet handled by the TS packet reproduction apparatus will be explained by using FIGS. 2 to 4. FIG. 2 is a diagram showing an example of a transport stream handled by the TS packet reproduction apparatus 11 according to an embodiment of the invention. FIG. 3 is a diagram showing an example of a transport header of a transport stream. FIG. 4 is a diagram showing an example of a PES of a transport stream.

FIG. 2 shows the relationship between a TS packet 20 of MPEG-2 systems and video and audio PES. The TS packet 20 of MPEG-2 systems consists of a packet string with one packet of 188 bytes. Each packet consists of a header 22 and a payload. The payload stores divided video PES 26 and audio PES 27. Here, the video PES 26 has a PES header 22, and payloads 23 and 24. The audio PES 27 has a PES header 22, and payloads 23 and 24.

FIG. 3 shows the configuration of a TS header 21. The TS header 21 has a sync byte 31, a PID 32, an adaptation field control 33, and an adaptation field 34. The adaptation field 34 has an adaptation field length 35, a PCR_flag 36, and a program clock reference (PCR) 37.

FIG. 4 shows the structure of a packetized elementary stream (PES). The structure of a PES is common to the video PES and audio PES. The PES 41 consists of a header called a PES header 22, and a payload called a PES packet data byte 47. A payload is compressed and coded video or audio data.

The PES header 22 includes a packet start code prefix 42, a stream id 43, a PES packet header length 44, a pts_dts FIG. 45, and a PTS/DTS 46.

EXAMPLE OF OPERATION OF TS PACKET REPRODUCTION APPARATUS ACCORDING TO AN EMBODIMENT OF THE INVENTION

Figure 5:
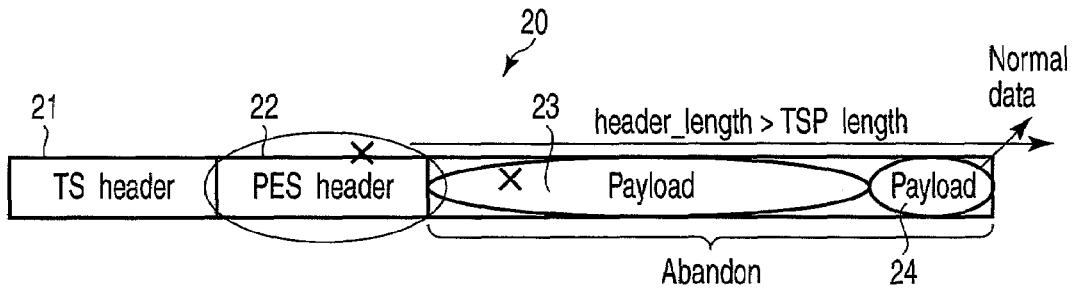
FIG. 5 is a diagram explaining an example of processing a TS packet including a PES by a TS packet reproduction apparatus according to an embodiment of the invention.
Figure 6:
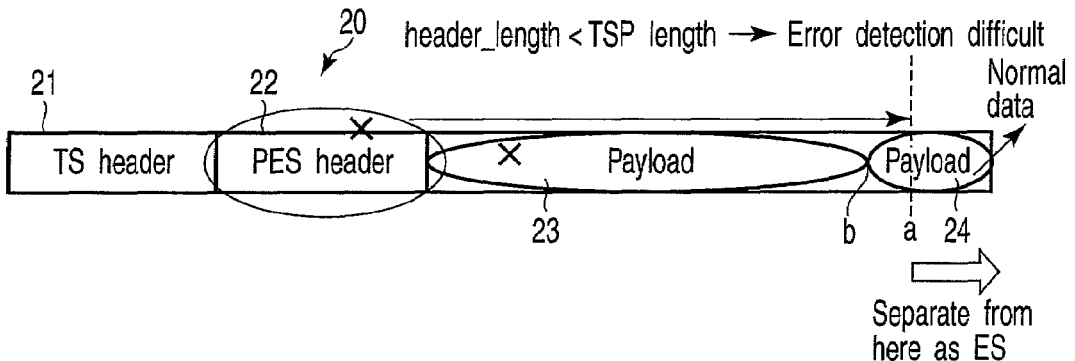
FIG. 6 is a diagram explaining an example of processing a TS packet including a PES by a TS packet reproduction apparatus according to an embodiment of the invention.
Figure 7:
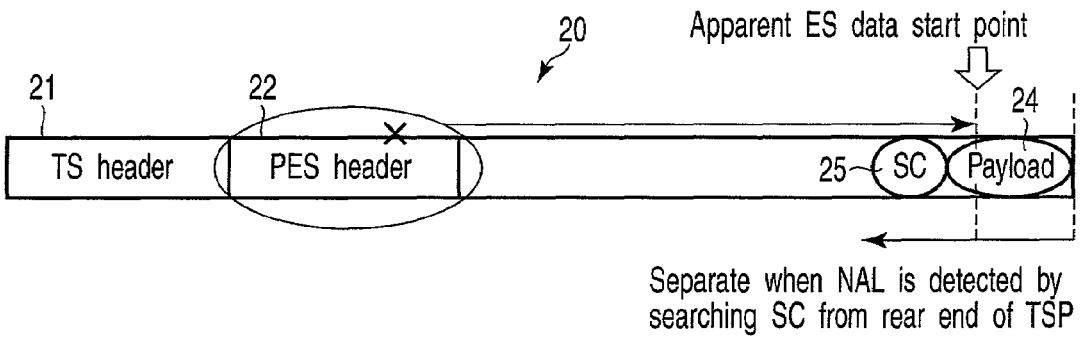
FIG. 7 is a diagram explaining an example of processing a TS packet including a PES by a TS packet reproduction apparatus according to an embodiment of the invention.

An explanation will be given of an example of the operation of the TS packet reproduction apparatus 11 as an embodiment of the invention with reference to the explanatory diagrams of FIGS. 5 to 7 and the flowcharts of FIGS. 8 to 11. FIG. 5 is a diagram for explaining an example of processing a TS packet by the TS packet reproduction apparatus 11. FIGS. 6 and 7 are diagrams for explaining an example of processing a TS packet by the TS packet reproduction apparatus 11.

Each step of the flowcharts of FIGS. 8 to 11 can be replaced by a circuit block. Therefore, all steps of each flowchart can be re-defined as blocks.

(Defect)

First, an explanation will be give of a defect that interrupts the reproduction operation of the TS packet reproduction apparatus. Namely, a TS packet includes a front end of a PES, and the length of a PES header (PES packet header length) is an abnormal value caused by an error, as shown in FIGS. 5 and 6. When the PES header length is an abnormal value, it is impossible to detect the beginning of a payload to be separated.

In contrast to the above, there is a method of abandoning a whole packet at the time when a TS packet error is detected. In this case, when a part of data with no error, or a payload 24 that is a normal data in FIG. 5 is included, this normal information is lost without being reproduced, but if possible, the normal data is to be transferred to a decoder. However, detection of this data is not easy as explained later.

When a TS packet includes the front end of a PES, the video payload separator 3 separates a payload of the PES, and outputs the separated payload, after obtaining system information such as a presentation time stamp (PTS). The PES header length is described in the PES header itself (PES_packet_header_length), and the parts at and after the end point of the header are separated as a payload to be transferred to a video decoder.

At this time, the PES header length is checked for an error. First, as shown in FIG. 5, when the decoded PES header length exceeds the TS packet length (=184 bytes, except a TS header), it is certainly recognized as an error. However, there is no method to detect the length of a header, it is inevitable to abandon a whole TS packet (TSP). Second, when the PES header length is prolonged by an error to the extent not exceeding a TS packet, as shown in FIG. 6, it is difficult to detect this error. In this case, the front end of the separated data begins at the halfway of an original payload, and the video decoder cannot normally decode the data. In either case, normal data cannot be obtained, the separated data is discontinuous, and the decoder misunderstands syntax, and the picture quality is seriously deteriorated by an interruption of video reproduction for about 5 seconds at the longest.

Embodiment 1

Figure 8:
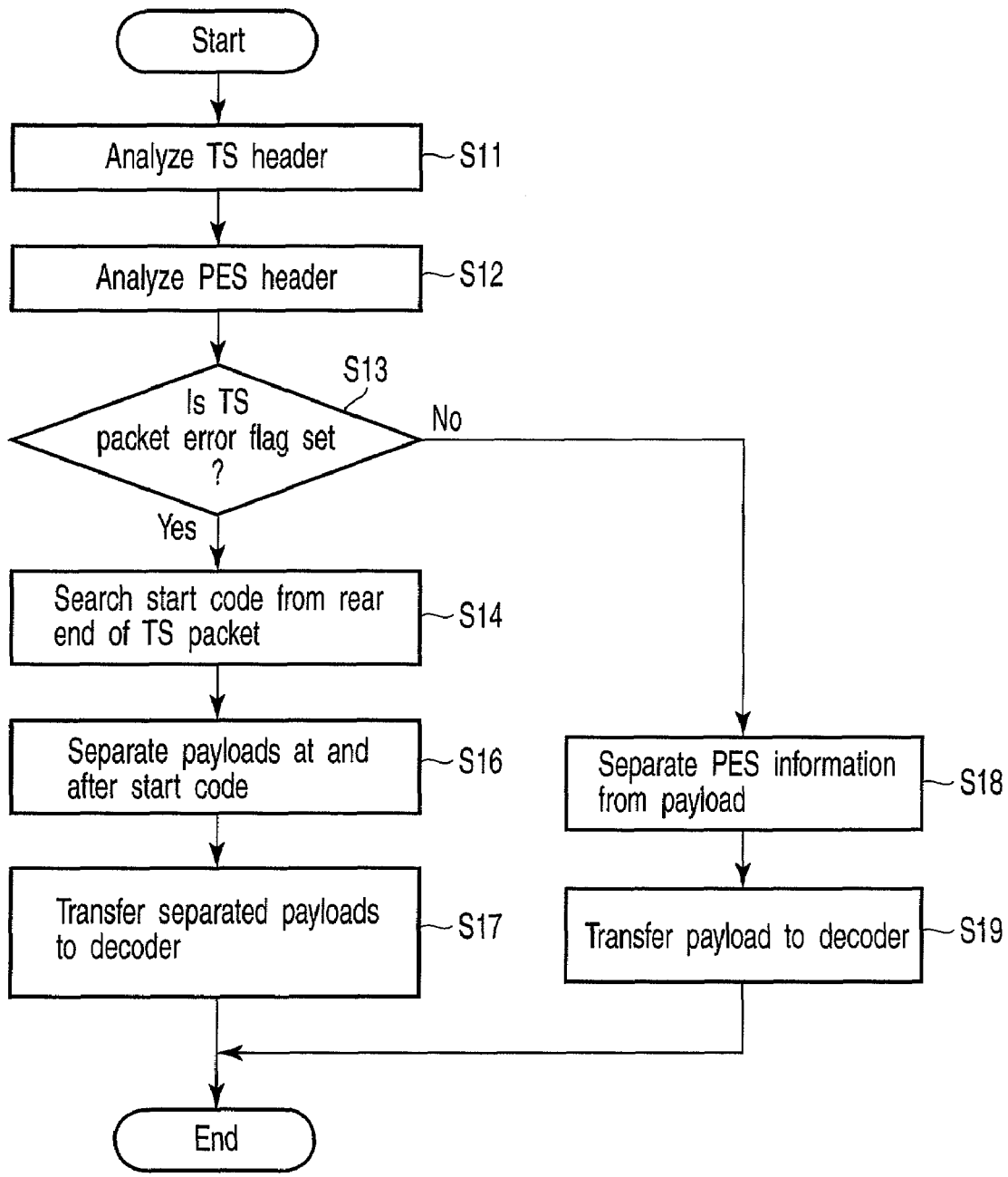
FIG. 8 is a flowchart explaining an example of processing a TS packet including a PES by a TS packet reproduction apparatus according to an embodiment of the invention.

A first embodiment provides a method of finding a start code by searching video payloads in a TS packet in the reverse direction from the rear end, and using the payloads at and after a start code, when an error is detected in a TS packet including a PES header (a transport_error_indicator of a TS header is on). FIG. 8 is a flowchart explaining an example of processing a TS packet including a PES header by the TS packet reproduction apparatus 11.

In the TS packet reproduction apparatus 11, the TS header analyzer 1 monitors a TS header included in a received transport stream (step S11). After the TS header analyzer 1 detects the TS header 21, the PES header analyzer 2 monitors the PES header 22 (step S12). After the TS header analyzer 2 detects the PES header 22, the TS packet reverse search unit 7 determines whether an error flag in the TS header 21 is set (step S13).

After the TS packet reverse search unit 7 detects that the error flag in the TS header 21 is set, the TS packet reverse search unit 7 detects a start code 25 by searching the TS packet from the rear end (step S14). Then, the video payload separator 3 separates the payloads at and after the start code 25 searched by the TS packet reverse search unit 7, and stores them in the video payload storage 4 (step S16). Then, the video payload storage 4 supplies the separated payloads to the audio/video decoder 6 (step S17).

In contrast, when the TS packet reverse search unit 7 determines the error flag in the TS packet is clear in step S13, the video payload separator 3 separates the payloads from the PES header, and stores the separated payloads in the storage 4 (step S18). Then, the video payload storage 4 supplies the separated payloads to the audio/video decoder 6 (step S19).

By using the method described above, even if the length of a PES packet header is prolonged by an error and a normal payload included in the TS packet must be abandoned, the beginning of the remaining payloads is detected, and the payloads are separated and supplied to a decoder. Therefore, an interruption of video reproduction can be avoided, and the reproduction quality of the decoder is increased by minimizing deterioration caused by discontinued data.

Embodiment 2

Figure 9:
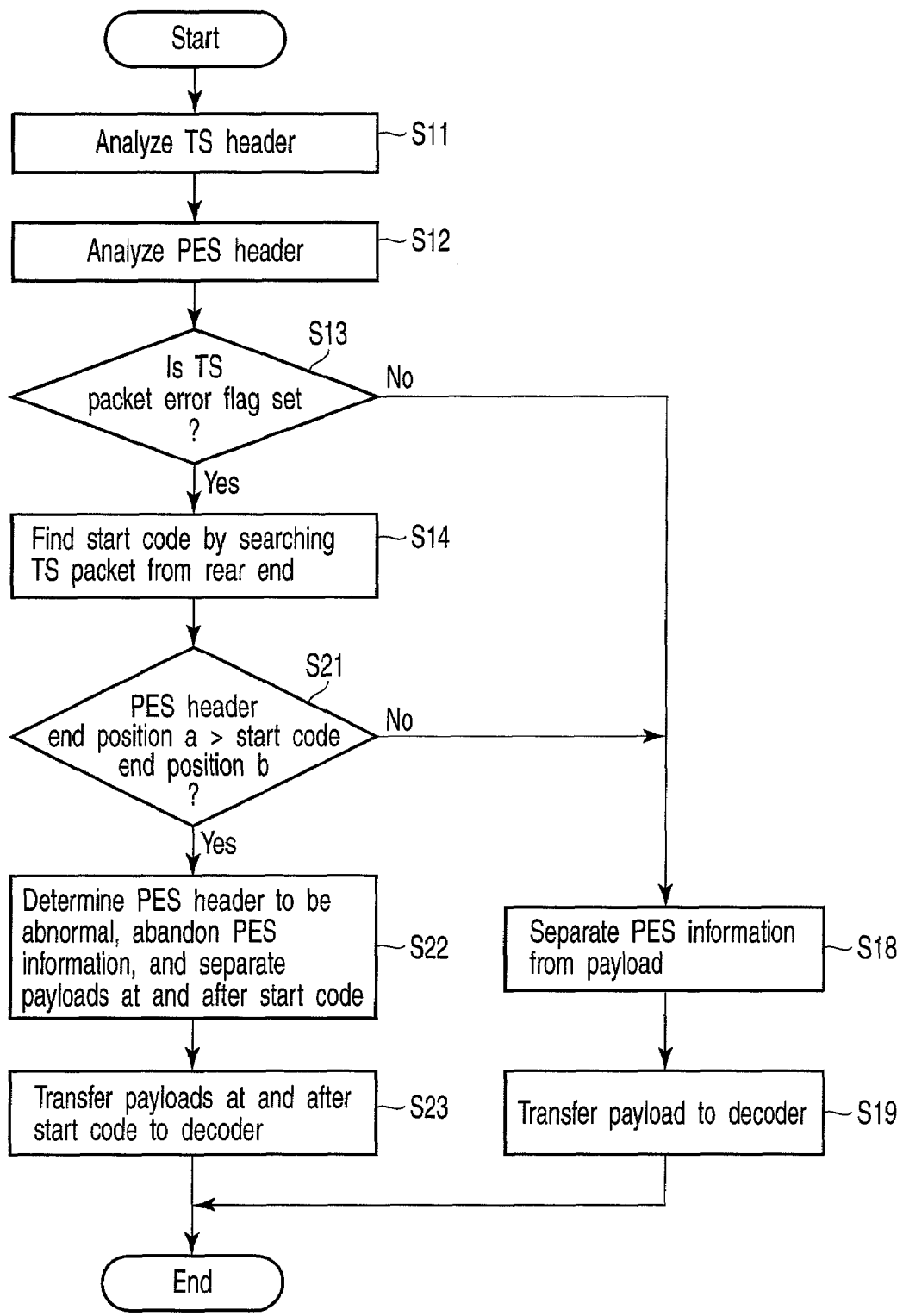
FIG. 9 is a flowchart explaining another example of processing a TS packet including a PES by a TS packet reproduction apparatus according to an embodiment of the invention.

A second embodiment provides a method of determining whether PES information is used, by comparing a PES header end position with a start code position, in addition to finding a start code by searching a TS packet from the rear end. FIG. 9 is a flowchart explaining an example of processing a TS packet including a PES header by the TS packet reproduction apparatus 11.

An explanation of steps S11 to S14, S18 and S19 common to the flowchart of FIG. 8 will be omitted, and only the different points will be explained.

The TS packet reverse search unit 7 compares a PES header end position a in a given TS packet with a start code end position b (not shown in FIG. 6). When the PES header end position a is located in the rear of the start code end position b, the TS packet reverse search unit 7 determines the PES header length to be abnormal, and abandons the PES information (step S21). The video payload separator 3 separates the payloads at and after the start code, and stores the separated payloads in the video payload storage 4 (step S22). Then, the video payload storage 4 supplies the separated payloads to the audio/video decoder 6 (step S23).

In contrast, when the PES header end position a is located in the forward of the start code end position, the TS packet reverse search unit 7 determines the PES header length to be normal (step S21). The video payload separator 3 separates the payloads from the PES header, and stores the separated payloads in the payload storage 4 (step S18). Then, the video payload storage 4 supplies the separated payloads to the audio/video decoder 6 (step S19).

As described above, whether the PES information is normal is determined by comparing the PES header end position a in a TS packet with the start code end position b, and the information is used later, thereby stable operation is ensured.

Embodiment 3

Figure 10:
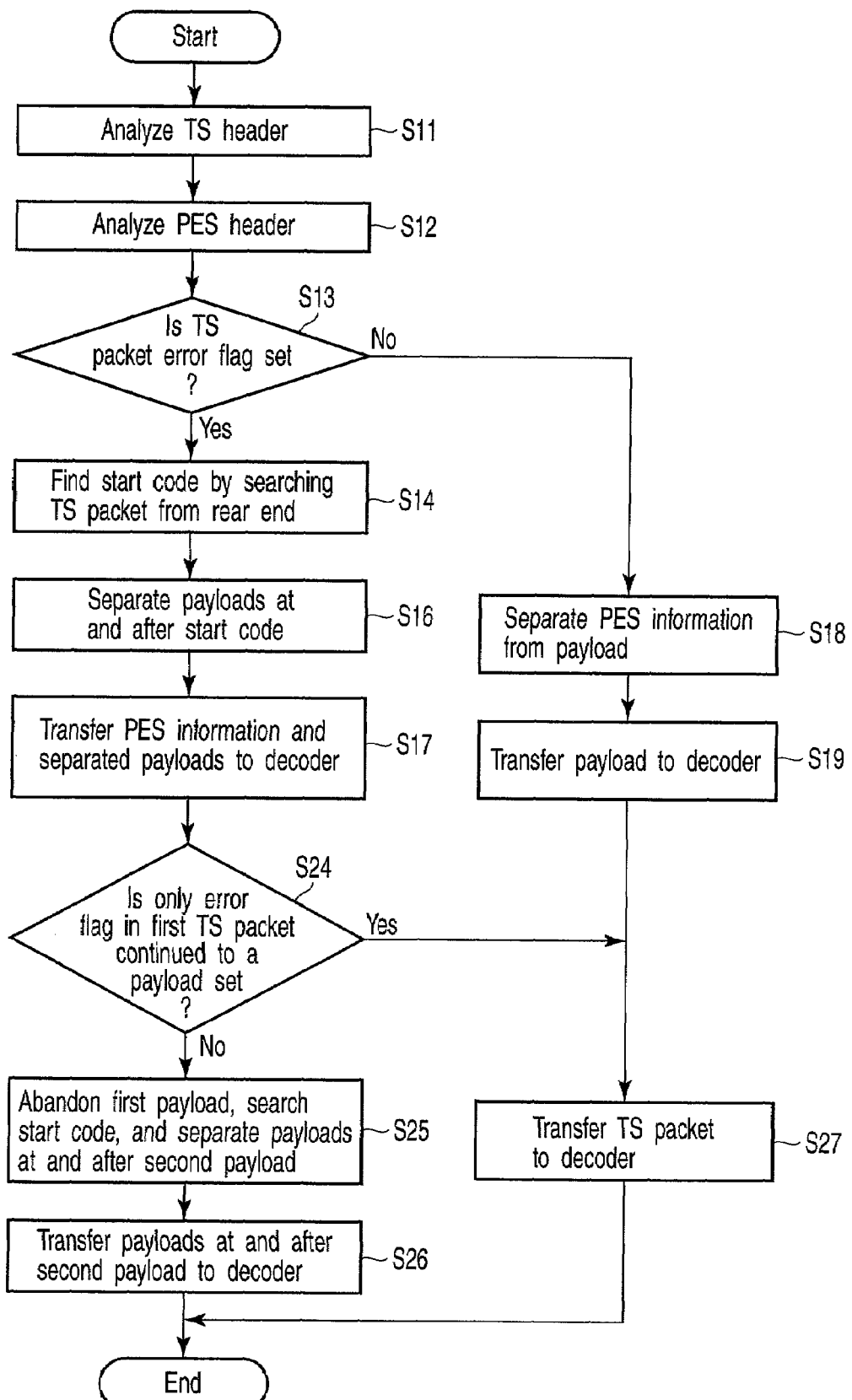
FIG. 10 is a flowchart explaining another example of processing a TS packet including a PES by a TS packet reproduction apparatus according to an embodiment of the invention.

A third embodiment provides a method of separating and using a second payload when an error flag in a subsequent TS packet is set, in addition to finding a start code by searching a TS packet from the rear end. FIG. 10 is a flowchart explaining an example of processing a TS packet including a PES header by the TS packet reproduction apparatus 11.

An explanation of steps S11 to S19 common to the flowchart of FIG. 8 will be omitted, and only the different points will be explained.

When an error flag in a TS packet with a payload continued to a subsequent packet is set, and error flags in two TS packets subsequent to the TS packet including the error flag are set, in step S24, the TS packet reverse search unit 7 abandons the payload (the first payload) in a TS packet next to the TS packet including the error flag. The TS packet reverse search unit 7 separates the payloads at and after the second payload, and stores the separated payloads in the video payload storage 4 (step S25). Then, the video payload storage 4 supplies the separated payloads to the audio/video decoder 6 (step S26).

In this case, a video payload is transmitted over two or more TS packets. Therefore, separation of the payloads is held until subsequent TS packets including the rear part of these payloads are received. When the TS packets including the rear part of the video payloads are received, the transport_error_indicator in all TS packets over which the video payload is continued are checked.

When the transport_error_indicator is raised only in the first (next) packet, the separated video payloads rarely include a error, and are transferred to the decoder.

However, when the TS packet reverse search unit 7 determines that the transport_error_indicator is raised in all TS packets, in step S24, the separated data mostly includes an error. In this case, the payloads are abandoned, and the data is not separated until the next start code is detected, thereby decreasing a section with discontinued data. Further, when the transport_error_indicator is determined to be off in the subsequent TS packets, the TS packet reverse search unit 7 transfers the TS packets to the audio/video decoder 6 as usual (step S27).

By performing appropriate processing according to an error flag in a subsequent TS packet, the video display can be increased.

Embodiment 4

Figure 11:
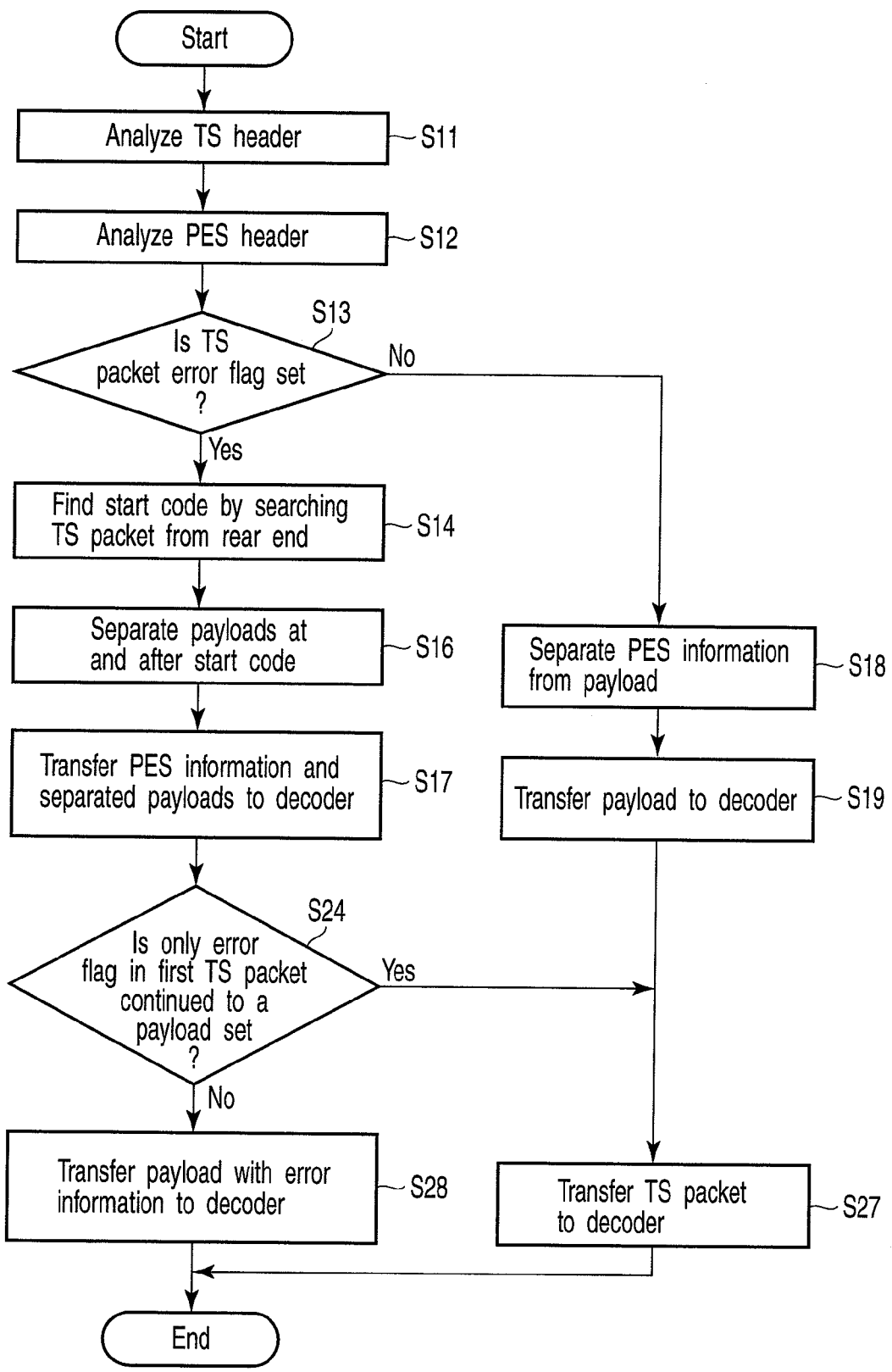
FIG. 11 is a flowchart explaining another example of processing a TS packet including a PES by a TS packet reproduction apparatus according to an embodiment of the invention.

A fourth embodiment provides a method of supplying error information to a decoder when an error flag in a subsequent TS packet is set, in addition to finding a start code by searching a TS packet from the rear end. FIG. 11 is a flowchart explaining an example of processing a TS packet including a PES header by the TS packet reproduction apparatus 11.

An explanation of steps S11 to S19 common to the flowchart of FIG. 8 will be omitted, and only the different points will be explained.

When an error flag in a TS packet with a payload continued to a subsequent packet is set, and error flags in two TS packets subsequent to the TS packet including the error flag are set, in step S24, the TS packet reverse search unit 7 does not abandon the payload of a TS packet with a payload continued to a subsequent packet, and generates error information according to the error flag of this TS packet. The error information and payload are supplied to the audio/video decoder 6 (step S23). Namely, the audio/video decoder 6 assumes processing of error information.

As the audio/video decoder 6 performs appropriate processing according to the error flag in the next TS packet, the video display quality can be increased.

In the embodiment described above, the processing shown in the flowcharts of FIGS. 8 to 11 is performed by the TS header analyzer 1 to TS packet reverse search unit 7 shown in FIG. 1. However, it is also preferable to perform similar processing by using a computer program including these processing and a CPU which sequentially executes the computer program, without depending on the configuration described herein.

As described above, according to the TS packer reproduction apparatus according to an embodiment of the invention, even if the length of a PES header is prolonged by an error and a normal payload included in the TS packet must be abandoned, the payload can be separated and supplied to a decoder. Further, by recognizing a data delimiter, deterioration of the picture quality caused by discontinued data is minimized, and the reproduction quality of a decoder can be increased.

<Configuration and Operation of Broadcast Reproduction Apparatus Using the TS Packet Reproduction Apparatus 11 According to an Embodiment of the Invention>

Figure 12:
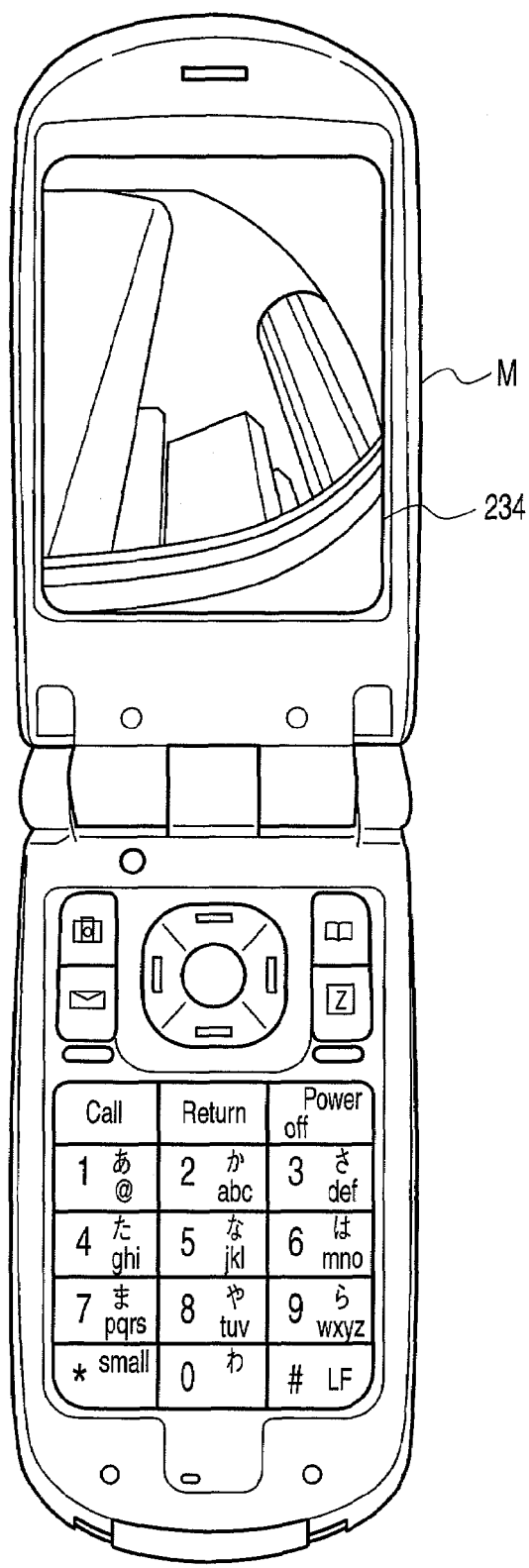
FIG. 12 is an external view showing the appearance of an example of a broadcast reception apparatus according to an embodiment of the invention.
Figure 13:
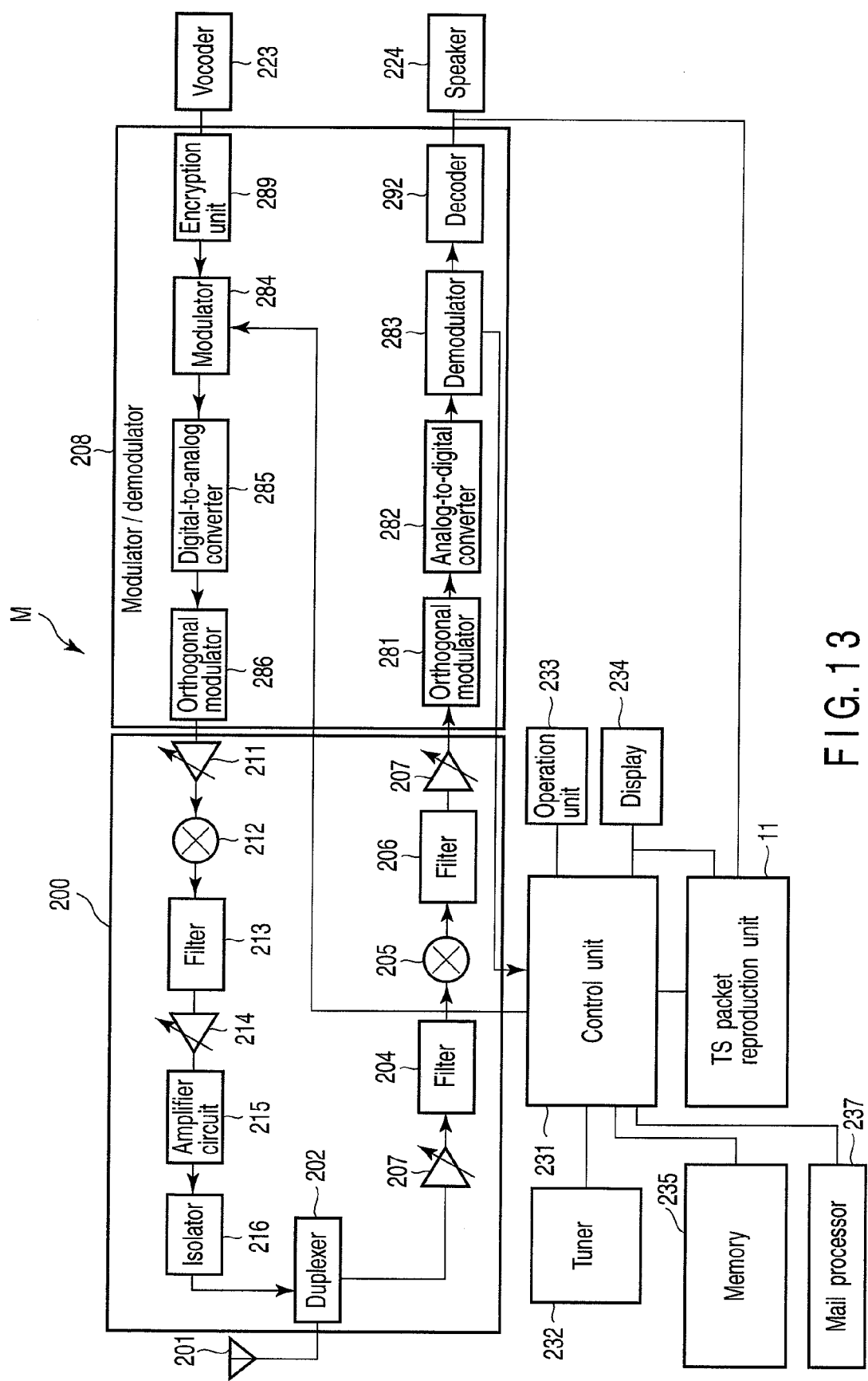
FIG. 13 is a block diagram showing an example of the configuration of a broadcast reception apparatus according to an embodiment of the invention.

The operation of the TS packet reproduction apparatus describe above is applicable to a cellular phone (a mobile communication apparatus) having a so-called one-segment television reproduction function. Hereinafter, a detailed explanation will be given of an example of using the apparatus according to the embodiment of the invention in a cellular phone having a television reproduction function. FIG. 12 is an external view showing the appearance of a broadcast reception apparatus according to an embodiment of the invention. FIG. 13 is a block diagram showing an example of the configuration of a broadcast reception apparatus according to an embodiment of the invention.

(Configuration and Operation)

An explanation will be given of a cellular phone that is an embodiment of the invention, by using FIGS. 12 and 13. A cellular phone (a mobile communication apparatus) M has a communication unit 200, an antenna 201, a duplexer 202, an RF reception gain variable amplifier 203, an RF bandpass filter 204, a frequency converter 205, an IF bandpass filter 206, an IF reception gain variable amplifier 207, a modulator/demodulator 208, an IF transmission gain variable amplifier 211, a frequency converter 212, an RF bandpass filter 213, an RF transmission gain variable amplifier 214, a power amplifier 215, an isolator 216, a vocoder 223, and a speaker 224.

The cellular phone M is connected to a control unit 231 to control all operations, a tuner unit 232, an operation unit 233 having switches, a display 234 to display operating information and photo images, a memory 235 to store moving picture content and program reservation information, a TS packet reproduction unit 11, and a mail processor 237. The output terminal of the TS packet reproduction unit 11 is connected to the display 234 and speaker 224.

The modulator/demodulator 208 comprises an orthogonal demodulator 281, an analog-to-digital converter 282, a signal demodulator 283, and a decoder 292. Further, the modulator/demodulator 208 has an encryption unit 289 to encrypt a signal from the vocoder 223, an information signal demodulator 284, a digital-to-analog converter 285, and an orthogonal modulator 286. In this configuration, a signal is demodulated by the orthogonal demodulator 281, the signal is converted to a digital signal by the analog-to-digital converter 282. The converted digital information signal is demodulated by the signal demodulator 283, and the demodulated signal is decoded by the decoder 292 and outputted from the decoder.

An explanation will now be given of the reception process of the cellular phone M configured as above. A forward link signal transmitted from a base station is received by the antenna 201, supplied to a receiver circuit by the duplexer 202, and amplified or attenuated by the RF reception gain variable amplifier 203. An unnecessary component of the signal is filtered by the RF bandpass filter 204, and the signal is converted from an RF band to an IF band by the frequency converter 205. An unnecessary component of the signal is filtered by the IF bandpass filter, and the signal is amplified or attenuated by the IF reception gain variable amplifier 207. The amplified or attenuated signal is input to the modulator/demodulator 208.

The modulator/demodulator 208 comprises an orthogonal demodulator 281, an analog-to-digital converter 282, a signal demodulator 283, an information signal modulator 284, a digital-to-analog converter 285, and an orthogonal modulator 286.

Here, the encryption unit 289 and decoder 292 are preferably encrypted and decoded by common encryption key information. The encryption prevents illegal listening to audio content. However, strictly, it is sufficient that the encryption key information from a mobile communication unit on the transmission side is common to the key information of the decoder 292 on the reception side.

Next, an explanation will be give of the reception operation of the cellular phone M having the above configuration. For the operating information displayed on the display 234, the control unit 231 controls each part as described below according to the operating information given by the user's operation unit 233. Namely, a signal demodulated by the orthogonal demodulator 281 is converted by the analog-to-digital converter 282, demodulated by the signal demodulator 283, and further decoded by the decoder 292, and output from the speaker 224 as audio.

The transmission operation of the cellular phone M will be explained hereinafter. As in the reception operation, for the operating information displayed on the display 234, the control unit 231 controls each part as described below according to the operating information given by the user's operation unit 233. Namely, a reverse link signal transmitted from a mobile station is given by the vocoder 223, and encrypted by the encryption unit 289. The encrypted signal is demodulated by the information signal demodulator 284, converted by the digital-to-analog converter 285, and demodulated by the orthogonal demodulator 286. The signal is amplified or attenuated by the IF transmission gain variable amplifier 211, and converted from an IF band to an RF band by the frequency converter 212. An unnecessary component of the signal is filtered by the RF bandpass filter 213. The signal is amplified or attenuated by the RF transmission gain variable amplifier 214, amplified by the power amplifier 215, supplied to the antenna 201 by the duplexer 202 through the isolator 216, and transmitted.

Broadcast Listening Function

In such a cellular phone, by providing a tuner function such as the tuner 232, a desired broadcast program is tuned according to an operating signal from the operation unit 233, and a transport stream signal of the program is stably reproduced by the method explained in the flowchart of FIG. 8, by using the TS packet reproduction apparatus 11. Therefore, stable video and audio can be enjoyed.

Further, as the memory 235 is provided, the user can record audio and video signals of a broadcast program in the memory 235, as well as enjoying a television broadcast through the tuner 232.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A broadcast reception apparatus comprising:
   a reception module configured to receive a broadcast signal, and to output a transport stream;
   a first determination module configured to receive the transport stream from the reception unit as Transport Stream (TS) packets, and to determine whether a Packetized Elementary Stream (PES) header exists in one TS packet;

a second determination module configured to determine whether the PES header comprises an error, when the first determination module detects the PES header;

a search module configured to detect a payload start position by searching the TS packet sequentially from an end and configured to detect a beginning of remaining payloads, when the second determination module determines that the PES header comprises the error;

a separator configured to separate the remaining payloads at and after the payload start position detected by the search module;

a decoder configured to decode the remaining payloads of the TS packets separated by the separator, and to output video and audio signals; and a controller configured to supply error information to a decoder in a stage, when an error flag in a next TS packet continued to a last payload in the TS packet comprising the PES header is set, and error flags in subsequent TS packets are also set.

2. The broadcast reception apparatus of claim 1, wherein the second determination module is configured to determine the PES header to have the error, when the TS packet comprises an error flag.

3. The broadcast reception apparatus of claim 1, wherein the search module is configured to determine the payload start position by searching a start code provided at the beginning of the payload.

4. The broadcast reception apparatus of claim 1, wherein the separator is configured to separate payloads from the payload start position, when an end position of the PES header indicated by a PES header length recorded in the PES header appears after the start code position provided at the beginning of the payload.

5. The broadcast reception apparatus of claim 1, wherein when a first error flag in a next TS packet continued to a last payload in the TS packet comprising the PES header is set, and error flags in subsequent TS packets are also set, the separator is configured to separate payloads at and after a second payload of the next TS packet.

6. A TS packet reproduction apparatus comprising:

a first determination module configured to receive a transport stream comprising TS packets, and to determine whether a PES header exists in each TS packet;

a second determination module configured to determine whether the PES header comprises an error, when the first determination module detects the PES header;

a search module configured to detect a payload start position by searching the TS packets sequentially from an end and configured to detect a beginning of remaining payloads, when the second determination module determines that the PES header comprises the error;

a separator configured to separate the remaining payloads at and after the payload start position detected by the search module;

a decoder configured to decode the remaining payloads of the TS packets separated by the separator, and to output video and audio signals; and a controller configured to supply error information to a decoder in a stage, when an error flag in a next TS packet continued to a last payload in the TS packet comprising the PES header is set, and error flags in subsequent TS packets are also set.

7. A broadcast reception method comprising:

receiving a broadcast signal;

outputting a transport stream;

receiving the transport stream as TS packets;

determining whether a PES header exists in each TS packet;

determining whether or not the PES header comprises an error when the PES header is detected;

finding a payload start position by searching the TS packet sequentially from an end when the PES header comprises the error;

detecting a beginning of remaining payloads;

separating the remaining payloads at and after the start position for the found payloads;

decoding the separated payloads, and outputting video and audio signals; and supplying error information to a decoder in a stage, when an error flag in a next TS packet continued to a last payload in the TS packet comprising the PES header is set, and error flags in subsequent TS packets are also set.

8. The broadcast reception method of claim 7, wherein the PES header is determined to have the error when the TS packet comprises an error flag.

* * * * *